S. AND J. STAPIENSKI.
CLOTHESLINE ATTACHMENT.
APPLICATION FILED APR. 23, 1921.

1,414,794.

Patented May 2, 1922.

INVENTORS
S. Stapienski
J. Stapienski
BY
M. Palen
ATTORNEY ive a line tightener so constructed as to per-
UNITED STATES PATENT OFFICE.

STANISLAW STAPIENSKI AND JAN STAPIENSKI, OF JERSEY CITY, NEW JERSEY.

CLOTHESLINE ATTACHMENT.

1,414,794. Specification of Letters Patent. Patented May 2, 1922.

Application filed April 23, 1921. Serial No. 463,756.

*To all whom it may concern:*

Be it known that we, STANISLAW STAPIENSKI and JAN STAPIENSKI, citizens of Poland, residing at Jersey City, in the county of Hudson and State of New Jersey, have invented certain new and useful Improvements in Clothesline Attachments, of which the following is a specification.

This invention relates to improvements in tensioning devices and has for its principal object to provide a device which is particularly adapted for use on clothes lines and the like.

It is well known that the common type of pulley line in dry weather will become slack and sag between the pulleys and during damp weather will shrink so as to tighten and in case the slack has previously been taken up will cause breakage and consequent annoyance. It is therefore one of the primary objects of this invention to provide a line tightener so constructed as to permit the line to be taken up or let out, depending on the condition thereof.

Another object of the invention resides in the provision of a device which may be easily and cheaply constructed and which rides on the upper run of the pulley line so as to always remain in place and be in position for instant use.

With these and other objects in view this invention consists in the novel construction, combination and arrangement of parts which will be fully set forth in the following specification; claimed and illustrated in the accompanying drawings in which:—

Figure 1:
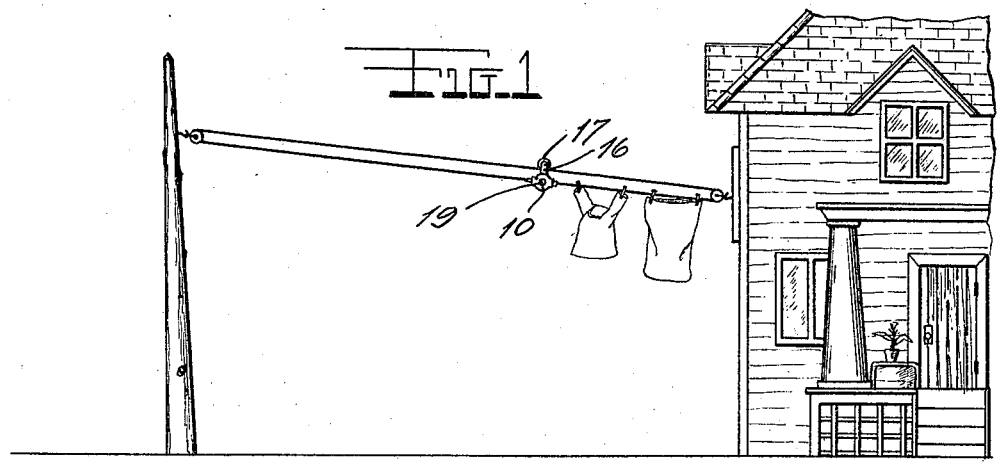
Figure 1 is a view showing this tension device in use.
Figure 2:
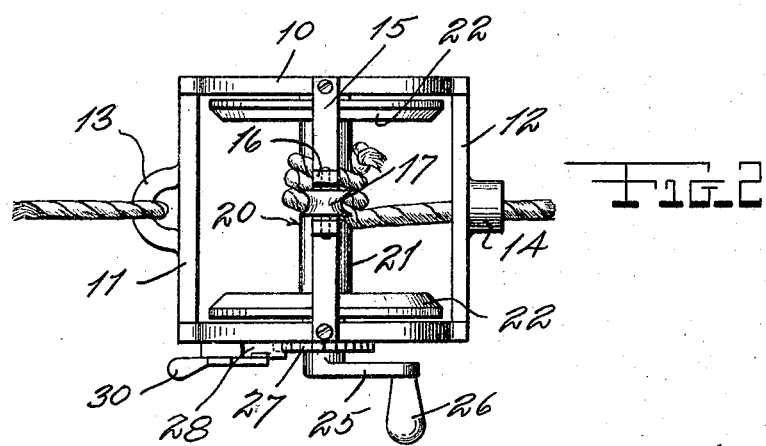
Figure 2 is a plan view of the tension device.
Figures 3, 4:
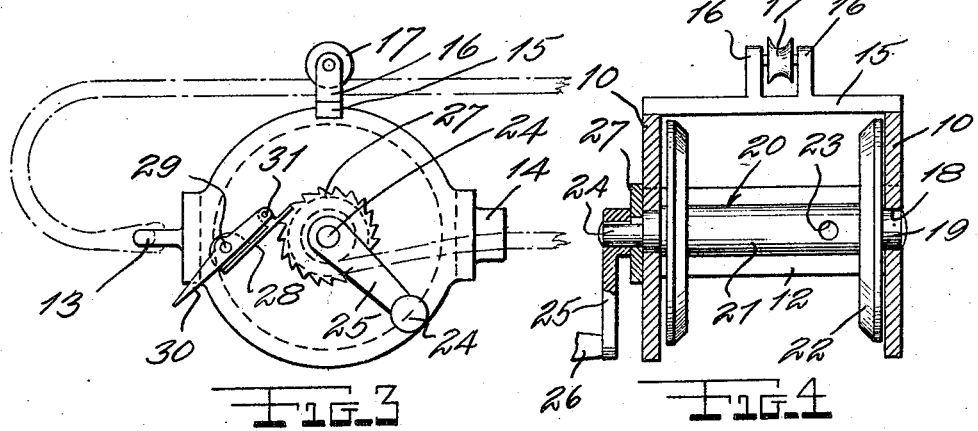
Figure 3 is a side view of Figure 2.
Figure 4 is a vertical sectional view through the device.

Reference being had to the drawings in detail, the device comprises a frame formed of a pair of plates 10 which are connected by cross bars 11 and 12 which are provided respectively with an eye 13 and a sleeve 14 which alines with an opening in the bar 12. A cross member 15 is secured to the upper edges of the plates 10 and extending upwardly therefrom are ears 16 between which a supporting pulley 17 is rotatably mounted.

Formed centrally in the plates 10 are openings 18 in which the trunnions 19 of a winding spool 20 are journaled. The spool above mentioned comprises a core 21 its opposite ends having flanges 22 between which the line is wound. Formed in the core near one end is an opening 23 for the reception of the end of the line and extending in axial alinement from one of the trunnions is a stud 24 to the outer end of which is secured a crank arm 25 provided with the handle member 26.

A ratchet wheel 27 is secured to the stud between the crank arm and the adjacent plate 10 and cooperating therewith is a pawl 28 which is pivoted as at 29 to the plate 10. A lever 30 is pivotally connected to the pivot pin 29 and has one end connected as at 31 to the pawl. In will thus be seen that the pawl may be disengaged from the ratchet by the manipulation of the lever.

In use, one end of a clothes line is attached to the eye 13 while the opposite end is passed over one of the supporting pulleys and thence between the pulley 17 and bar 15, after which it is carried over the opposite supporting pulley and thence through the sleeve 14 and opening 23 in which it is secured. It is obvious that the slack may be taken up by turning the crank arm in a clockwise direction and the adjustment will be retained by the engagement of the pawl 28 in the teeth of the ratchet wheel 27. Should it be desired to pay out on the line, pressure is applied to the free end of the lever 30 thus lifting the pawl from engagement with the ratchet and permitting the spool 20 to rotate in a counter-clock-wise direction. Attention is directed to the fact that the device is permanently associated with the line as the pulley 17 suspends the device from the upper run of the line and no interference is encountered in manipulating the line as the device will readily travel along the upper run without encountering any obstructions.

While in the foregoing there has been shown and described the preferred embodiment of this invention it is to be understood that minor changes in the construction, combination and arrangement of parts may be resorted to without departing from the spirit and scope of the invention as claimed.

What is claimed is:—

A tension device comprising a frame, an eye at one side of said frame, a winding drum mounted in the frame, a crank arm to rotate said drum, said drum having an opening therethrough, a pawl and ratchet mechanism to hold said drum against unwinding movement, a pulley for supporting the device from the upper run of a pulley line, and a manually operable lever extending outward of said frame whereby the pawl may be disengaged from the ratchet.

In witness whereof we affix our signatures.

STANISLAW STAPIENSKI.
JAN STAPIENSKI.